United States Patent [19]
Robinson

[11] 3,902,697
[45] Sept. 2, 1975

[54] BUTTERFLY VALVE
[75] Inventor: Daniel T. Robinson, West Allis, Wis.
[73] Assignee: Milwaukee Valve Company, Inc., Milwaukee, Wis.
[22] Filed: Sept. 27, 1973
[21] Appl. No.: 401,343

[52] U.S. Cl................................. 251/306; 251/173
[51] Int. Cl.............................................. F16k 1/22
[58] Field of Search........................... 251/305–308, 251/173, 358, 367

[56] References Cited
UNITED STATES PATENTS

| | | | |
|---|---|---|---|
| 3,029,063 | 4/1962 | Moen................................. | 251/306 |
| 3,526,385 | 9/1970 | Rohrer............................... | 251/306 |
| 3,531,075 | 9/1970 | Kitazawa............................ | 251/306 |
| 3,549,123 | 12/1970 | Bell..................................... | 251/306 |
| 3,565,395 | 2/1971 | Hansen.............................. | 251/306 |

FOREIGN PATENTS OR APPLICATIONS 952,445  3/1964  United Kingdom................. 251/307

*Primary Examiner*—Charles J. Myhre
*Assistant Examiner*—Ira S. Lazarus

[57] ABSTRACT

The butterfly valve includes a body having a generally cylindrical bore defining a flow passage and a generally circular, stem-mounted disc member rotatably mounted within the bore for shutting off flow. The disc member is comprised of two identically arranged halves which are formed from an inexpensive, relatively thin material. The disc halves include central semicylindrical portions defining a hub for receiving the stem and a flange defining a continuous, peripheral groove including diametrically opposed annular portions which encircle the stem. Disposed in the disc groove is a unitary, resilient sealing ring including annular sections which engage flattened portions of the bore to provide stem seals throughout all positions of the disc and semicircular portions which sealingly engage the bore when the disc member is in a closed position.

The disc halves and sealing ring can be assembled together before installation of the disc member into the valve body bore or assembled together inside the valve body bore.

13 Claims, 9 Drawing Figures

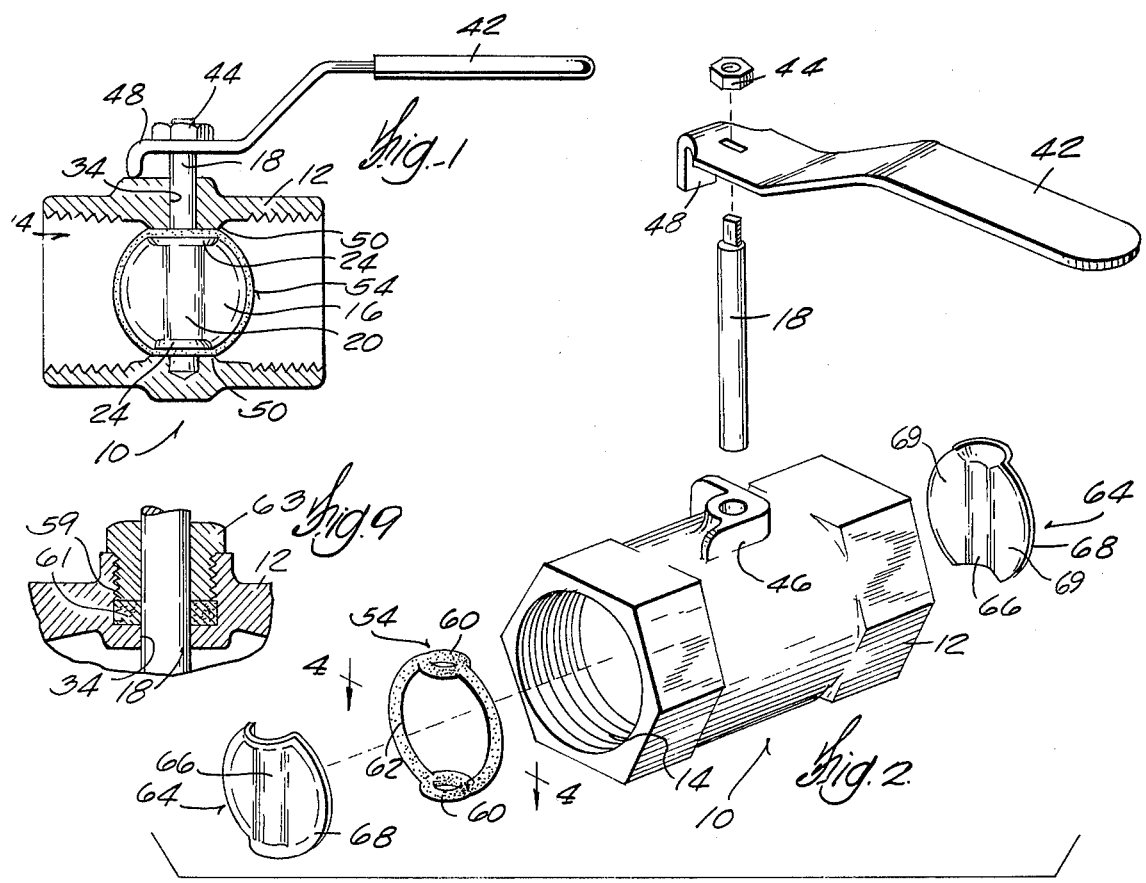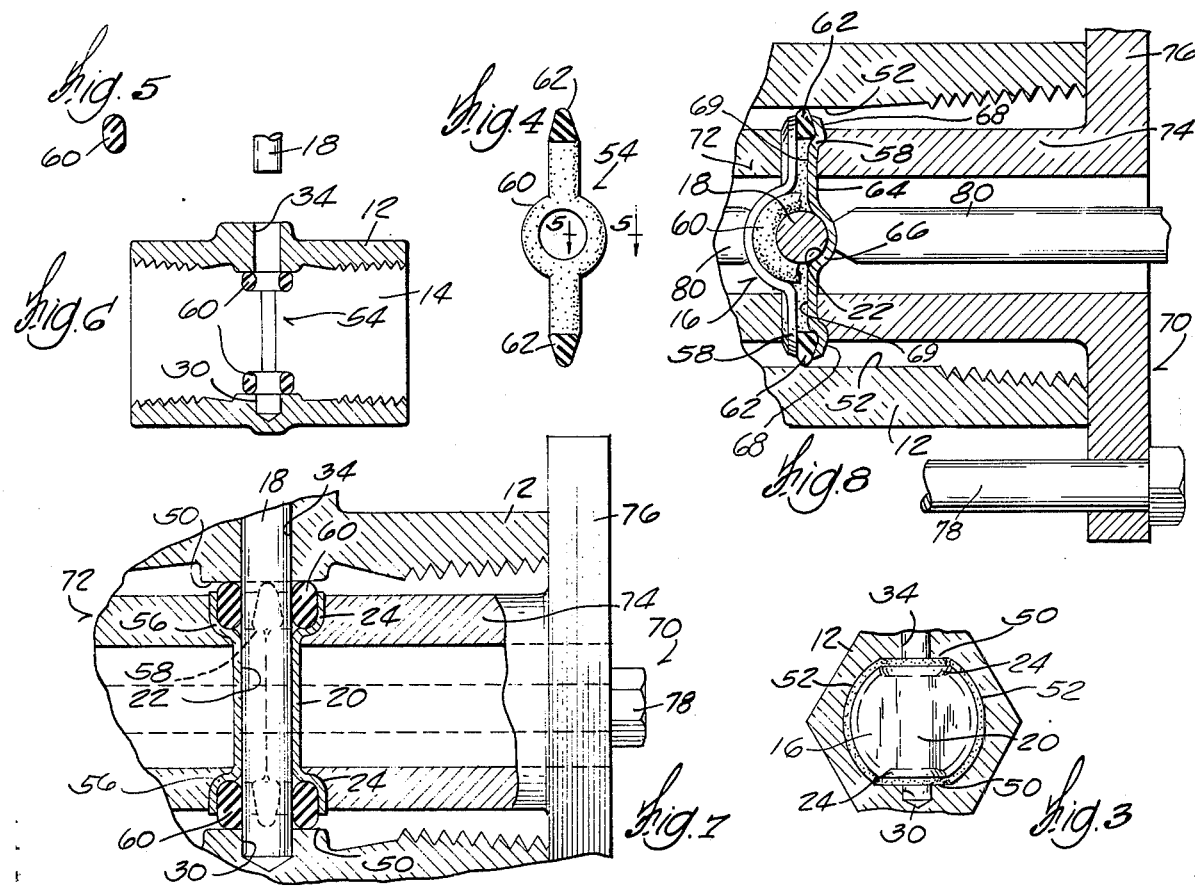

BUTTERFLY VALVE

BACKGROUND OF THE INVENTION

This invention relates to a butterfly valve and a method for making same.

The butterfly valve typically includes a circular disc member which is pivotally mounted inside a cylindrical bore defining a flow passage. The disc is mounted to turn on an axis extending transversely of the flow passage between an open position where its plane is generally coincident with the direction of flow and a closed position where its plane is at a right angle to the direction of flow. In a closed position a fluid seal is provided either by the outer periphery of the disc sealingly engaging a sealing member provided in the interior of the valve housing or by sealing member carried on the periphery of the disc sealingly engaging a seating surface on the interior of the housing.

Discs used in prior art valves usually are machined or die cast parts. Consequently, butterfly valves have not been widely used in systems requiring a small shutoff valve, e.g., in the ½ to 2 inch range, because the relatively massive disc adversely affects the flow characteristics of the valve. Also, machined or die cast discs represent a significant portion of the total fabrication and assembly costs for most butterfly valves.

SUMMARY OF THE INVENTION

An object of this invention is to provide a butterfly valve capable of being used in relatively small flow systems.

Another object of this invention is to provide a simply arranged butterfly valve which can be conveniently fabricated and assembled by inexpensive techniques.

A further object of this invention is to provide a butterfly valve having a disc which can be fabricated from relatively thin, inexpensive materials.

A still further object of this invention is to provide a simple, inexpensive method for fabricating and assembling a butterfly valve.

Other objects, aspects and advantages of this invention will become apparent upon reviewing the following detailed description, the drawing and the appended claims.

The butterfly valve provided by the invention includes a body having a generally cylindrical bore which defines a flow passage through the body, a stem rotatably journaled in the body and extending transversely of the flow passage, and a generally circular disc member mounted on the stem for rotatable movement within the bore between an open position and a closed position to shutoff flow. The disc member is composed of a pair of sections or halves which are formed from a relatively thin material and are mounted in facing relationship on the stem. The disc halves are preferably identically arranged and include portions which cooperate to define a hub for receiving the stem and peripheral flanges which cooperate to define a peripheral groove for receiving and positively retaining a resilient sealing ring.

The sealing ring preferably is a unitary member including opposed annular sections which encircle the stem to provide stem seals throughout all positions of the disc member and semicircular sections which sealingly engage the bore when the disc member is in the closed position.

The disc halves and sealing ring can be assembled together before installation of the disc member into the valve body bore or assembled together inside the valve body bore. In the latter case, the sealing ring and stem preferably are first installed inside the bore and the disc halves then installed in facing relationship through the opposite ends of the bore. After the hub-defining portions of the disc halves are moved into engagement with the stem and the flanges of the disc halves are moved into compressive engagement with the sealing ring, the disc halves are fastened to the stem, such as by spot welding.

BRIEF DESCRIPTION OF THE DRAWINGS

FIG. 1 is a side view of a butterfly valve, partially sectioned, embodying various of the features of the invention.

FIG. 2 is an enlarged, exploded view of the valve illustrated in FIG. 1.

FIG. 3 is a fragmentary, end view of the valve illustrated in FIG. 1.

FIG. 4 is a sectional view taken along the line designated 4—4 in FIG. 2.

FIG. 5 is a sectional view taken along the line designated 5—5 in FIG. 4.

FIGS. 6, 7 and 8 are fragmentary, cross sectional views of the valve illustrated in FIG. 1 shown at various stages of assembly.

FIG. 9 is a fragmentary, sectioned view of an alternate arrangement for the valve illustrated in FIG. 1.

DESCRIPTION OF THE PREFERRED EMBODIMENTS

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Illustrated in the drawing is a butterfly valve 10 including a body 12 having a generally cylindrical bore 14 which defines a flow passage extending substantially straight through body 12. The opposite ends of valve body 12 can be threaded as shown or otherwise formed in a conventional manner for connection with associated plumbing.

A generally circular disc member 16 is mounted on a shaft or stem 18 for rotatable movement within bore 14. Disc member 16 has a diametrically extending, enlarged central portion 20 defining a hub 22 for receiving stem 18 and opposed annular bosses 24 surrounding hub 22 (See FIGS. 1 and 7). Disc member 16 is secured to stem 18 by a suitable means, such as by spot welding.

Stem 18 includes an inner end which is rotatably received, i.e., journaled, in a recess 30 provided in valve body 12 and an outer end which rotatably extends through an aperture 34 provided in valve body 12 coaxially with recess 30. A suitable actuator means, such as a handle 42, is fastened to the outer end of stem 18, such by a nut 44, for rotating disc member 16 about the transverse pivot axis provided by stem 18 between a closed or flow shutoff position where the plane of disc member 16 is generally at a right angle to the direction of flow (See FIG. 3) and an open position where the plane of the disc is substantially aligned with the direction of flow (See FIG. 1). Rotational movement of disc member 16 at the fully opened and fully closed positions is limited by a stop lug 46 provided on the exterior of valve body 12 and which is engaged by an inturned flange 48 located on the end of handle 42.

Valve bore 14 includes diametrically opposed, flattened wall portions 50 in the vicinities surrounding recess 30 and aperture 34 and diametrically opposed, generally semicircular wall portions 52 extending circumferentially between flattened portions 50 (See FIGS. 1 and 3). Bore portions 50 and 52 serve as seating surfaces as explained in more detail below. The outer surface of each disc boss 24 is flat and is spaced inwardly a small distance from the corresponding flattened bore portion 50. The circular portions of disc member 16 have an outer radius which is slightly less than the radius of the corresponding bore semicircular portion 52.

For receiving a sealing ring 54, disc member 16 has a continuous peripheral recess or groove including opposed annular portions 56 (See FIG. 7) which are located in bosses 24 and encircle stem hub 22 and opposed generally semicircular portions 58 (See FIGS. 7 and 8) which extend between bosses 24 and connect annular portions 56. Semicircular groove portions 58 have a dove tailed or generally inverted, V-shaped cross section.

Sealing ring 54 is formed as a unitary assembly and includes annular sections 60 which fit into annular portions 56 of the disc groove and semicircular sections 62 which connect annular sections 60 and fit into semicircular portions 58 of the disc groove. Sealing ring 54 is made from a relatively resilient material suitable for the type service in which the valve is to be used, such as natural rubber, synthetic elastomers, fluorocarbon materials and the like. Annular sections 60 of sealing ring 54 have a generally ellipitical cross section (See FIG. 5) and semicircular sections 62 of sealing ring 54 have a generally trapezoidal cross section (See FIG. 4).

In order to provide an interference fit between annular sections 60 of sealing ring 54 and flattened bore portions 50, each annular sealing ring section 60 extends outwardly from annular groove portion 56 by a dimension which exceeds the clearance between the outer surface of boss 24 and the flattened bore portion 50. This interference fit, which is maintained throughout all positions of disc member 16, causes annular sections 60 of sealing ring 54 to be compressed radially into sealing engagement with stem 18 (See FIG. 7). Thus, the annular portions of the sealing ring provide fluid tight stem seals at all positions of disc member 16.

Semicircular sections 62 of sealing ring 54 extend outwardly beyond the outer periphery of disc member 16 and sealingly engage the corresponding semicircular bore portions 52 when disc member 16 is in the closed position (See FIGS. 3, 7 and 8). The dove-tailed or inverted, V-shaped cross section of disc groove portions 58 and the trapezoidal shaped cross section of sealing ring sections 62 cooperate to provide a positive restraint against the sealing ring being twisted or being dislodged from the disc groove by high velocity flow during valve operation.

Any leakage past the stem seal into recess 30 might cause a build up of pressure behind the inner end of stem 18 tending to force the stem out of valve body 12. This potential problem can be eliminated by venting recess 30 to the atmosphere, such as by extending recess 30 completely through the valve body or by providing a small vent port (not shown) which communicates with recess 30.

In the embodiment illustrated in FIGS. 1–3, the torque required to rotate disc member 16 between a fully open position and a nearly closed position is controlled by the surface area contact and the degree of interference between section 60 of sealing ring 54 and the flattened bore portions 50. This torque can be quite low, particularly when the sealing ring 54 is made from a material having a relatively low coefficient of friction. A low torque can be quite desirable for some applications particularly when the valve is manually operated and used solely for shutoff purposes. However, in other applications, such as where the valve is used to meter flow and the disc member is disposed at an intermediate position, the frictional drag provided by the annular sealing ring sections may not be sufficient to prevent the disc member from being rotated by fluid forces.

To eliminate this problem, means can be provided for selectively varying the rotational drag on the stem. While various arrangements can be used, in the alternate embodiment illustrated in FIG. 9, valve body 12 is provided with an annular recess 59 which is coaxial with stem-receiving aperture 34 and receives a packing material 61. The packing material 61 is compressed into engagement with the outer surface of stem 18 by a gland nut 63 threaded into recess 59. The frictional drag imposed on stem 18 by packing material 61 is adjusted by tightening gland nut 63 (to increase drag) or loosening gland nut 63 (to decrease drag). Packing material 61 can be the same general type commonly used for valve glands, except it has a high coefficient of friction in order to be capable of imposing a relatively high rotational drag on stem 18. For example, the packing material can be a braided asbestos impregnated with a material having a relatively high coefficient of friction. Thus, in addition to acting as a drag producing means for stem 18, the packing material also serves as a secondary stem seal.

In order to reduce fabrication and assembly costs and to minimize the flow restriction produced by the disc member, disc member 16 is constructed from two separate halves 64 (See FIG. 1). Disc halves 64 are mirror images, and preferably identically arranged, with each including a generally semicylindrical central portion 66 and a peripheral flange 68 which, upon face-to-face assembly of the two disc halves, define stem hub 22 and groove portions 56 and 58, respectively. As best shown in FIG. 8, the peripheral flange 68 on each disc half 64 lies away from a plane coincident with the flat confronting or inner face 69.

With this arrangement, disc halves 64 can be conveniently and economically fabricated from a relatively rigid, inexpensive thin sheet material, such as metal, plastic or the like. While other materials and forming techniques can be used, disc halves 64 are preferably formed from a thin sheet (e.g., 1/32 inch thick) of stainless steel (e.g., 7,000 series) by a conventional metal stamping process.

Disc member 16 and sealing ring 54 can be assembled either outside or inside valve body 12. In the former case, disc halves 64 are first secured together in face-to-face relationship with sealing ring 54 disposed between flanges 68. After the disc member/sealing ring assembly has been installed inside valve body bore 14 with bosses 24 and annular sealing rings sections 60 axially aligned with the corresponding recess 30 and aperture 34, stem 18 is installed, disc member 16 fastened to stem 18, and the remaining assembly steps are completed in the usual manner.

Referring to FIGS. 6–8, an exemplary method for assembling valve 10 in the latter manner will be described. Sealing ring 54 is first installed into valve body bore 14, such as with a suitably arranged holding fixture (not shown), with annular sections 60 in coaxial alignment with recess 30 and aperture 34 and semicircular sections 62 located in a position corresponding to a closed position of disc member 16 (See FIG. 6). Stem 18 is thereafter inserted through aperture 34, passed through the openings of both sealing ring sections 60 and the inner end moved into recess 30. The two disc halves 64 are then installed.

Suitable means are provided for holding disc halves 64 so they can be installed, in facing relation, through opposite ends of bore 14. While other arrangements can be used, in the specific method illustrated, such means includes separate fixtures 70 and 72, each having a hollow jig 74 adapted to carry a disc half 64 on the outer end and a centrally apertured clamping bracket 76 (See FIG. 7). The disc halves 64, carried on fixtures 70 and 72, are moved into place inside valve bore 14 with semi-cylindrical portions 66 adjacent to the opposite sides of stem 18 and flanges 68 adjacent to the opposite edges of sealing ring 54.

Fixtures 70 and 72 are illustrated in a horizontal position in FIGS. 7 and 8, in which case a suitable means, such as a magnet or the like, is used to temporarily retain disc halves 64 in place on the outer ends of jigs 74. In actual practice, it may be more desirable for the fixtures to be in a vertical position during installation of the disc halves. When the fixtures are in this position, the valve body is moved down over the jig of a first fixture carrying one of the disc halves, rotated 180° with the first fixture being held in place, and then moved down the jig of a second fixture carrying the other disc half.

After the disc halves have been installed, fixtures 70 and 72 are clamped together, such as by tightening a plurality of bolts 78 (one shown) connecting clamping brackets 76. The resultant clamping action on disc halves 64 moves semicylindrical portions 66 into engagement with stem 18 and causes flanges 68 to compress both the annular sections 60 and the semicircular sections 62 of sealing ring 54.

Semicylindrical portions 66 of disc halves 64 are then secured to stem 18 in a suitable manner. While other techniques can be employed, in the specific method illustrated, a pair of oppositely disposed welding electrodes 80 of a conventional spot welding machine (not shown) are inserted through the openings of fixtures 70 and 72 and moved into engagement with the outer surfaces of semicylindrical portions 66. The welding machine is energized to spot weld each disc half 64 to stem 18 at one or more locations.

If desired, other fastening means, such as rivets, bolts, pins and the like, can be used to fasten the disc member to the stem. When made from a plastic material, the disc member can be secured to a metallic stem by an adhesive, such as an epoxy material which is suitable for that purpose. When both the disc halves and the stem are made from a thermoplastic material, the disc member can be fused to the stem by a suitable thermoplastic welding technique.

From the above detailed description, it can be seen that a butterfly valve arranged in accordance with the invention has many distinct advantages. The disc member is formed from two halves which can be identically arranged and fabricated from relatively thin materials. The resultant thinness of the disc member minimizes the flow restriction produced thereby, permitting the butterfly valve to be used advantageously in small flow systems, e.g., ½ to 2 inches. Instead of requiring expensive machining or die casting operations, the disc halves can be fabricated by conventional inexpensive forming techniques which reduces the overall fabrication and assembly costs of the valve. The sealing ring does not have to be stretched for mounting into the disc member groove; thus, the sealing ring can be made from seal materials which ordinarily tend to become permanently deformed by stretching. The sealing ring is positively restrained against being dislodged from the disc member groove by high velocity flow. Moreover, the disc member can be conveniently assembled either outside or inside the valve body bore.

I claim:

1. A butterfly valve comprising
a body having a generally cylindrical bore defining a flow passage therethrough;
a stem rotatably mounted in said body and extending transversely of said flow passage;
a generally circular disc member carrying a resilient sealing ring on the outer periphery and supported on said stem for rotatable movement between an open position and a closed position where said sealing ring sealingly engages said bore to shut off flow through said flow passage;
said disc member including a pair of relatively thin circular disc halves disposed in confronting face-to-face relationship, each of said disc halves being formed with a diametrically extending semicylindrical groove portion cooperating with the corresponding semicylindrical portion of the other of said disc halves to define a hub receiving said stem and each of said disc halves also being formed with a peripheral flange lying away from a plan coincident with the confronting face and cooperating with the corresponding peripheral flange on the other of said disc halves to define a peripheral groove therebetween receiving said sealing ring, said cooperating flange compressingly engaging said sealing ring to positively restrain said sealing ring from being twisted or dislodged from said peripheral groove during opening and closing of said disc member; and
means for securing both of said disc halves to said stem.

2. A butterfly valve according to claim 1 wherein
said bore includes diametrically opposed flattened wall portions in the vicinity of said stem and diametrically opposed, generally semicircular wall portions joining said flattened wall portions;
said peripheral groove includes a pair of diametrically opposed annular portions respectively encircling the opposite ends of said stem hub and a pair of diametrically opposed generally semicircular portions extending circumferentially between corresponding of said annular portions;

said sealing ring is a unitary member and includes a pair of opposed annular sections disposed in corresponding of said annular groove portions, said annular sealing ring sections being in an interference fit with the corresponding flattened wall portions of said bore throughout all positions of said disc member; and said sealing ring further includes a pair of opposed, generally semicircular sections connecting said annular sections and disposed in corresponding of said semicircular groove portions, said semicircular sealing ring sections sealingly engaging corresponding semicircular wall portions of said bore when said disc member is in a closed position.

3. A butterfly valve according to claim 2 wherein the portions of said peripheral flanges defining said semicircular portions of said peripheral groove converge radially outwardly; and said semicircular portions of said sealing ring have a generally trapezoidal cross section and include a smaller outermost portion extending radially beyond the peripheries of the corresponding disc flanges.

4. A butterfly valve according to claim 1 wherein said securing means comprises a welded connection between each of said semicylindrical portions and said stem on opposite sides of said stem.

5. A butterfly valve according to claim 4 wherein each of said disc halves is formed from a thin sheet of stainless steel.

6. A butterfly valve according to claim 5 wherein said disc halves are formed by stamping.

7. A butterfly valve according to claim 6 wherein said disc halves are mirror images of each other.

8. A butterfly valve according to claim 1 including means for selectively imposing sufficient rotational drag on said stem to retain said disc member at positions intermediate the open and closed positions whereby said disc member can throttle flow through said flow passage and yet can be moved to the open and closed positions.

9. A butterfly valve according to claim 8 wherein said means for selectively imposing rotational drag on said stem comprises an annular recess in said body and encircling one end portion of said stem;

a material having a high coefficient of friction disposed in said recess and compressingly engaging said stem; and a gland nut threadably received in said body and disposed in compressive engagement with said material for selectively adjusting the compression of said material with said stem.

10. A butterfly valve comprising a body having a generally cylindrical bore defining a flow passage therethrough, said bore including diametrically opposed flattened wall portions and diametrically opposed generally semicircular wall portions joining said flattened wall portions;

a rotable stem extending between said flattened wall portions and perpendicularly to the direction of flow;

a generally circular disc member carrying a resilient sealing ring on the outer periphery and supported on said stem for rotatable movement between an open position generally aligned with the direction of flow and a closed position generally perpendicular to the direction of flow;

said sealing ring being a unitary member including a pair of opposed annular sections encircling corresponding opposite ends of said stem and disposed in an interference fit with corresponding flattened wall portions of said bore throughout all positions of said disc member to form a seal about said stem;

said sealing ring further including a pair of opposed, generally semicircular sections connecting said annular sections and sealingly engaging corresponding semicircular wall portions of said bore when said disc member is in a closed position;

said disc member including a pair of relatively thin circular disc halves disposed in confronting, face-to-face relationship, each of said disc halves being formed with a diametrically extending, semicylindrical groove portion cooperating with the semicylindrical groove portion of the other of said disc halves to define a hub receiving said stem and each of said disc halves further being formed with a peripheral flange lying away from a plane coincident with the confronting face and cooperating with the corresponding peripheral flange on the other of said disc halves to define a peripheral groove therebetween receiving said sealing ring;

said cooperating disc flanges including first portions defining a pair of diametrically opposed annular groove portions encircling the opposite ends of said stem hub and receiving corresponding annular portions of said sealing ring;

said cooperating disc flanges including second portions defining a pair of diametrically opposed, generally semicircular groove portions extending circumferentially between corresponding annular groove portions and receiving corresponding semicircular sealing ring sections, said second flange portions compressively engaging said semicircular sealing ring portions to positively restrain said semicircular sealing portions from being twisted or dislodged from said peripheral groove during opening and closing of said disc member; and each of said disc halves being secured to said stem by a welded connection between each of said semicylindrical portions and said stem on opposite sides of said stem.

11. A butterfly valve according to claim 10 wherein said disc halves are mirror images of each other and are formed as stampings from a thin sheet of stainless steel.

12. A butterfly valve according to claim 11 wherein said second portions of said peripheral flange converge radially outwardly; and said sealing ring semicircular portions have a generally trapezoidal cross section and include a smaller outermost portion extending radially beyond the peripheries of the corresponding disc flanges.

13. A butterfly valve according to claim 12 including an annular recess in said body and encircling one end portion of said stem;

a material having a high coefficient of friction disposed in said recess and compressingly engaging said stem; and a gland nut threadably received in said body and disposed in compressive engagement with said material for selectively adjusting the compression of said material with said stem and selectively imposing sufficient rotational drag on said stem to retain said disc member at positions intermediate the open and closed positions whereby said disc member can throttle flow through said flow passage.

* * * * *

UNITED STATES PATENT OFFICE
CERTIFICATE OF CORRECTION

PATENT NO. : 3,902,697
DATED : September 2, 1975
INVENTOR(S) : Daniel T. Robinson It is certified that error appears in the above—identified patent and that said Letters Patent are hereby corrected as shown below:

Claim 1, line 25, delete "flange" and substitute therefor --- flanges ---.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*